No. 12,130. REISSUED JULY 7, 1903.

H. H. McINTIRE.

PHOTOGRAPHIC PRINTING APPARATUS.

APPLICATION FILED JUNE 16, 1903.

2 SHEETS—SHEET 1.

Witnesses:

H. M. Baldwin.

A. A. Ege

Inventor:

Harvey H. McIntire by Theodore Dalton

Atty.

No. 12,130. REISSUED JULY 7, 1903.

H. H. McINTIRE.

PHOTOGRAPHIC PRINTING APPARATUS.

APPLICATION FILED JUNE 16, 1903.

2 SHEETS—SHEET 2.

Witnesses:

H. M. Baldwin.

A. A. Ege.

Inventor:

Harry H. McIntire by Theodore Dalton

Atty.

No. 12,130. Reissued July 7, 1903.

UNITED STATES PATENT OFFICE.

HERVEY H. McINTIRE, OF SOUTH BEND, INDIANA.

PHOTOGRAPHIC-PRINTING APPARATUS.

SPECIFICATION forming part of Reissued Letters Patent No. 12,130, dated July 7, 1903.

Original No. 727,670, dated May 12, 1903. Application for reissue filed June 16, 1903. Serial No. 160,639.

*To all whom it may concern:*

Be it known that I, HERVEY H. McINTIRE, a citizen of the United States of America, residing at South Bend, in the county of St. Joseph and State of Indiana, have invented a Photographic-Printing Apparatus, of which the following is a specification.

This invention relates to a machine for printing photographs.

The object of the invention is to print a number of photographs from the same negative by successive applications of the tympan to the negative, the tympan being automatically brought into engagement with the negative simultaneously with the admission of light to the case in which the negative is contained.

Other objects are to provide a rock-shaft to which the platen and light-controlling means are connected and an arm on the rock-shaft adapted to be adjusted with relation to its operating mechanism so that it may be operated for a longer or shorter predetermined period, and thereby enable the machine to be used with different kinds of sensitized paper requiring longer or shorter exposures.

With these objects in view the invention consists in the novel construction, combination, and aggroupment of parts, as will be more fully described hereinafter and finally pointed out in the appended claims.

Figure 1:
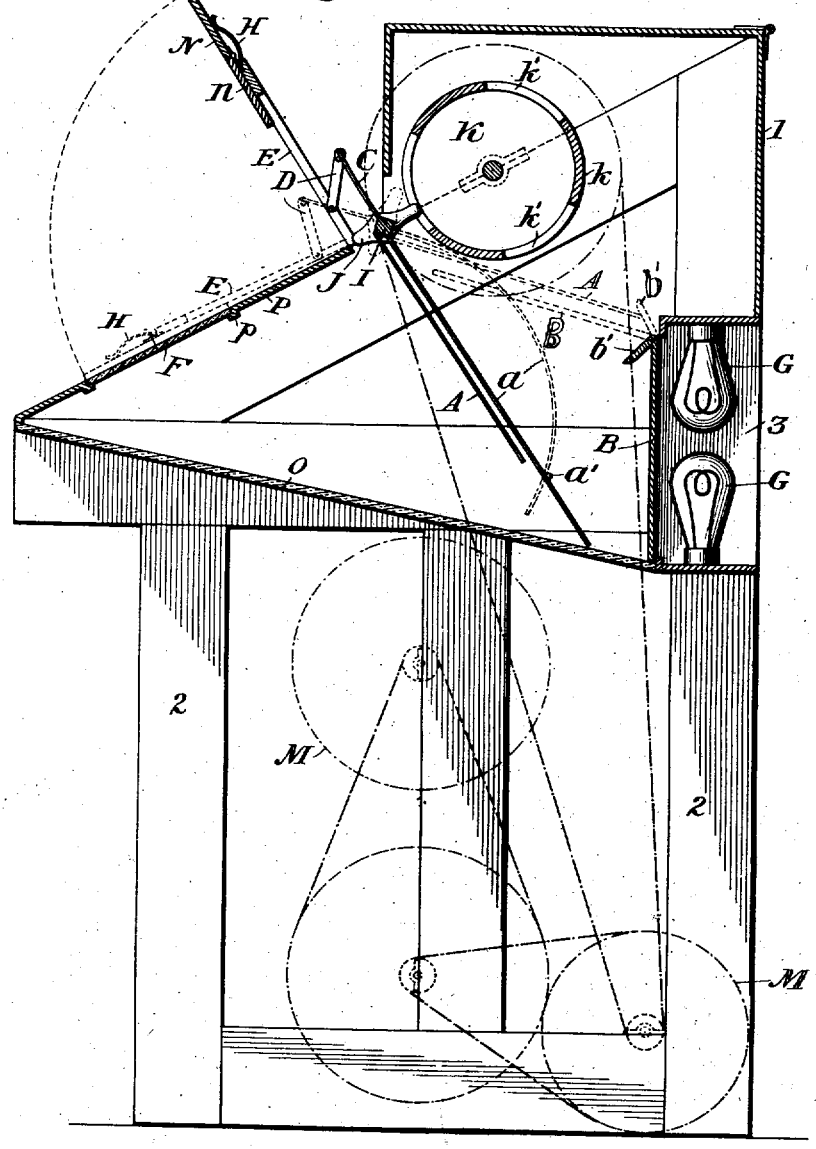
Figure 2:
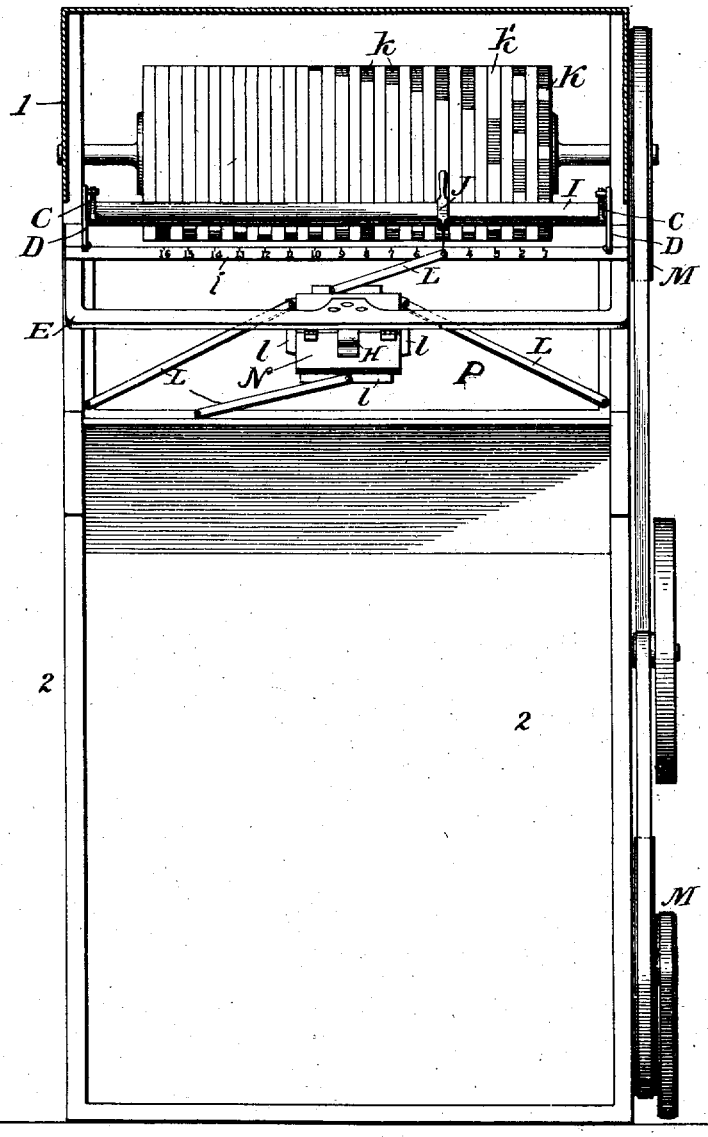

In the accompanying drawings, forming part of this specification, Figure 1 is a longitudinal vertical section of the apparatus complete. Fig. 2 is a front elevation with the top of the casing broken away.

In carrying out my invention I mount the mechanism in a suitable case or cabinet 1, supported by a frame 2 and having suitable gearing or belt-pulleys M mounted thereon, which are driven by any motor power. In the back of the case is a compartment 3, adapted to contain a source of light, which in the present instance comprises two incandescent electric lamps G G, the light from which is adapted to be automatically admitted to the cabinet or shut off from the same at predetermined intervals by the mechanism hereafter described. In the sides of the casing is mounted a cylinder K, composed of a plurality of segmental disks $k$, each disk having slots $k'$ of equal length and at equal distances apart, so that the segments of each disk are of equal length, but each disk having a different number of segments and slots. The segments of any one of the disks are adapted to engage a trip-arm J, mounted on and longitudinally adjustable along a rock-shaft I, journaled in the sides of the case parallel with the cylinder. Secured to the ends of the rock-shaft and extending upwardly at right angles therefrom are arms C, having a pivoted connection with links D, which are in turn pivoted to a vibrating frame E, carrying at its end a platen N, which is composed of a fixed part $n$ and a hinged end $n'$, adapted to be bent backwardly by the operator while the tympan or photographic paper is being held thereto and which is normally held parallel with the fixed part $n$ by means of a spring H.

Secured to the rock-shaft and extending downwardly into the case is a lever A, adapted to vibrate when the shaft is rocked and operate the mechanism for admitting or excluding the light. This mechanism may be an electric switch for making and breaking the circuit of an electric current, or, as illustrated in the drawings, a shutter B, pivoted to the top of the compartment 3 and having an offset arm $b$, against which the lever A engages to lift the shutter, as shown in dotted lines in Fig. 1. A spring-arm $a$ is secured to the rock-shaft I, extends down parallel with the lever A, and is engaged near its free end by a pin $a'$.

The front of the case is closed by an inclined face-board P, having an opening in which the negative F is mounted, the said negative being held therein by a frame composed of a plurality of arms L, pivoted to the face-board at different points and carrying blocks $l$ at their free end in which a negative may be clamped, and thus adapt the machine for printing from any-sized negative. When only one-sized negatives are used, the face-board may be provided with an inwardly-turned flange $p$ around the edge of the opening, as shown in Fig. 1.

The bottom of the cabinet is covered by a mirror or other reflector O, which is inclined downwardly from the face-board P at the proper angle to reflect the rays of light onto the negative.

The operation is as follows: The gearing M drives the cylinder K at a uniform speed, and when the trip-arm J has been adjusted on the rock-shaft I to a position opposite any one of the disks $k$ the said arm will be engaged by the segments on the disk. Each disk having a different number of slots $k$ and different-sized segments between the slots $a$, a longer or shorter period of operation for the trip-arm may be provided and the same predetermined by means of a scale $i$ on the front of the frame E, the number opposite each disk being the number of units of time the trip-arm will be in engagement with the segments on said disks, so that the machine may be set to operate successfully with all kinds of photographic paper requiring long or short exposures. As the arm is tripped the platen N, through the medium of the arms C and links D, descends and brings the tympan into engagement with the negative, and simultaneously with this action the source of light in the compartment 3 is admitted to the cabinet and reflected on the negative by the mirror O, the same being operated by the arm A, as before described. As the disk $k$ continues to rotate the slot $k'$ will come in alinement with the trip-arm, which will be immediately returned to its normal position by the spring $a$, the platen N will be elevated, the arm A lowered, and the source of light cut off, as shown in full lines in Fig. 1, when the machine is ready for the next operation.

Having thus described my invention, what I claim, and desire to secure by Letters Patent, is—

1. In a photographic-printing apparatus, a case having means to hold a negative therein, an intermittently-operated platen, an intermittently-admitted light, mechanism for bringing the platen into engagement with the negative and for synchronously admitting the light to the case, and an adjustable device on said mechanism for changing the duration of time for the admission of the light and for the engagement of the platen with the negative.

2. In a photographic-printing apparatus, a case having means to hold a negative therein, a vibratory platen, a light adapted to be intermittently admitted to and shut out from the case with each vibration of the platen, a rocking member for operating the platen and for admitting light to the case, and means on the rocking member for changing the duration of time for the admission of the light and for the engagement of the platen with the negative.

3. A photographic-printing apparatus consisting of a case having means to hold a negative therein, a rock-shaft in the case, an adjustable trip-arm on said rock-shaft, means to operate the trip-arm at predetermined intervals, means to control a source of light to the case, mechanism carried by the rock-shaft to operate the light-controlling means, mechanism carried by the rock-shaft to bring and hold the tympan in engagement with the negative synchronously with the admission of the light, and means carried by the rock-shaft to automatically return the parts to their normal position.

4. In a photographic-printing apparatus, the combination of a case having a face-board to hold a negative, a source of light in said case, a rock-shaft having an adjustable trip-arm and an arm to control the admission of the light, a revoluble cylinder having segments adapted to engage the trip-arm, a vibratory frame carrying a platen adapted to bring the tympan in engagement with the negative, a connection between the frame and the rock-shaft and a spring on the rock-shaft to return the parts to their normal position.

5. A photographic-printing apparatus, comprising a case, the front of which is provided with an opening, means to hold a negative in the opening, a compartment having a light therein, a shutter to control the admission of light to the case, a revoluble cylinder composed of a plurality of disks having slots and segments of different lengths, a rock-shaft, a trip-arm on the rock-shaft adapted to be adjusted to be operated by any disk, a platen, and shutter-operating mechanism extending from opposite sides of the rock-shaft to operate the shutter and platen synchronously, and a spring to retract the parts.

6. In a photographic-printing apparatus, a case provided with an adjustable negative-supporting frame, a vibrating platen adapted to be intermittently engaged with the negative, a light adapted to be intermittently admitted to the case, means for operating the platen synchronously with the admission of light, and means for automatically returning the parts to their normal position.

7. In a photographic-printing apparatus, a case provided with an adjustable negative-supporting frame consisting of arms pivoted to the case and carrying clamping-blocks at their free ends.

8. In a photographic-printing apparatus, a case having its face-board provided with a negative-support adapted to hold different-sized negatives, said support consisting of arms pivoted to the case and carrying clamping-blocks at their free ends.

9. In a photographic-printing apparatus, a case having an inclined face-board provided with a negative-support, a compartment formed at the back of the case for containing a light, a reflector arranged at an angle to the face-board and extending from the lower end thereof to the bottom of the light-compartment and means for intermittently admitting the light to the case.

10. In a photographic-printing apparatus, a case provided with means to hold a negative therein, a light adapted to be intermittently admitted to the case, a rock-shaft, a platen operated by said rock-shaft, an arm on the rock-shaft to control the admission of light, means for rocking the shaft and a trip-arm on the rock-shaft adapted to be adjusted to change the duration of time for the admission of light and for the engagement of the platen with the negative.

11. In a photographic-printing apparatus, a case provided with means to hold a negative therein, a light adapted to be intermittently admitted to the case, a revoluble cylinder having segments of different length, a rock-shaft provided with an adjustable arm adapted to be tripped by the segments, a platen operated by said rock-shaft, an arm on the rock-shaft to control the admission of the light to the case synchronously with the operation of the platen, and means to automatically return the parts to their normal position.

12. In a photographic-printing apparatus, the combination with a case having a negative and a light-containing compartment therein, of a rock-shaft having arms extending in opposite directions, a platen connected to one of the arms and the other arm adapted to control the admission of light to the case, a trip-arm on the rock-shaft, and a plurality of revoluble disks each having segments of different length adapted to engage the trip-arm, and means to adjust the trip-arm opposite any one of the disks to change the duration of time for the admission of light and for the engagement of the platen with the negative.

13. A photographic-printing apparatus consisting of a case provided with means to hold a negative therein, a rock-shaft having arms extending in opposite directions, a light-compartment having a shutter adapted to be engaged by one of the arms, a platen-frame jointedly connected with the other arm, a platen on the frame, a trip-arm on the rock-shaft, a revoluble cylinder composed of a plurality of disks each having segments of different lengths adapted to engage the trip-arm to rock the shaft, means to permit the trip-arm to be adjusted opposite any disk, and a spring on the rock-shaft to return the parts to their normal position.

HERVEY H. McINTIRE.

Witnesses:
A. D. HARRIS,
LOUISE HANAUER.